Jan. 13, 1970   I. BERMAN ET AL   3,489,309
PRESSURE VESSELS
Filed Dec. 13, 1966   2 Sheets-Sheet 2

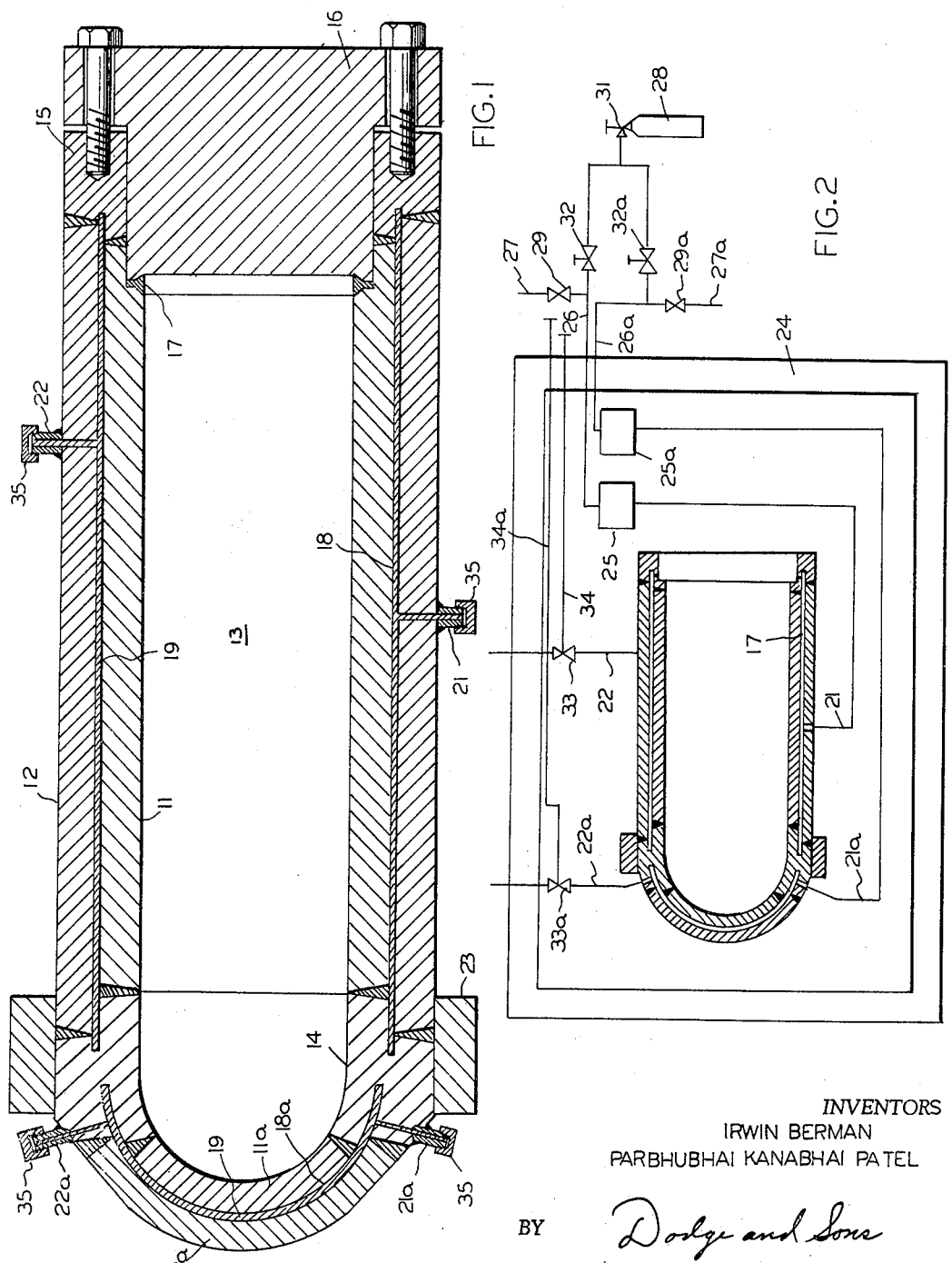

INVENTORS
IRWIN BERMAN
PARBHUBHAI KANABHAI PATEL

BY *Dodge and Sons*

ATTORNEYS

United States Patent Office 3,489,309
Patented Jan. 13, 1970

3,489,309
PRESSURE VESSELS
Irwin Berman, Bronx, N.Y., and Parbhubhai Kanabhai Patel, Cartaret, N.J., assignors to Foster Wheeler Corporation, Livingston, N.J., a corporation of New York
Filed Dec. 13, 1966, Ser. No. 601,442
Int. Cl. B65d 7/42
U.S. Cl. 220—3
15 Claims

ABSTRACT OF THE DISCLOSURE

Commercial size, high pressure vessels and end closures of the multilayer type characterized by a plurality of preformed superposed metal walls which are separated from each other by closed, pressure-tight spaces completely filled by a mass of fill metal. The fill metal is introduced into said spaces in the molten state and under a pressure which insures against the presence of voids in the finished structure. In one version the pressure is relieved after the fill metal freezes, and the fill spaces are subsequently sealed off. With this method, the resulting fill layers are unpressurized, and the composite structure resembles a monoblock. In another version a higher filling pressure is used, and the spaces are sealed while the fill metal is under pressure. This method produces pressurized fill layers and is employed to create a favorable residual stress pattern in the layers of the composite structure.

---

This invention relates to high pressure vessels, and in particular high pressure vessels having volumes large enough to make them useful in commercial, as contrasted to laboratory, processes.

In general, high pressure vessels for commercial processes fall into two categories. The first includes the monoblock or thick walled cylinders and spheres, and the second includes the layered vessels of the shrink fit type. Monoblock vessels in large sizes are difficult to make, because of the problem of bending or forming the walls. Moreover, as shown by the Lamé stress equations, the stress intensity through the wall of a monoblock vessel varies greatly with radius, and consequently the pressure-handling capability of the vessel is severely limited. Even for an infinite wall thickness, the permissible internal pressure for a vessel of this kind cannot exceed one-half of the allowable or design stress intensity of the material from which the wall is made. This problem of pressure-handling capability is further compounded by the fact that hardenability considerations limit severely the thickness of the steel plates that are used to form the walls. For example, in the case of T-1 steel, the high allowable stress figure can be used only in thicknesses less than 2¼ inches.

The pressure limitations of a monoblock vessel can be raised somewhat by autofrettage techniques, but this approach also has limitations. In the first place, autofrettage requires pressures which are much higher than design pressure, and which may even approach the burst pressure of the vessel. Second, the exact properties of the material in the stress range beyond the yield point are difficult to determine, and may vary not only from vessel to vessel but also from point to point in a single vessel. Finally, the exact relationship between the measured material properties and the multiaxial stresses in the vessel at pressures for which portions of the wall are in the plastic range is an approximation. These variations in material properties in the plastic range, and the approximations involved in their application, mean that the true residual stress pattern is open to question. Thus, even if the autofrettage process is done accurately, still most of the vessel is left understressed except for a special vessel in which it may be accepted that the design pressure is equal to the pressure which makes the vessel fully plastic.

The recognized limitations of the monoblock vessel have given rise to the use of the shrink fit vessel. In these vessels, the wall is formed from a number of relatively thin superposed layers, between each adjacent pair of which is created an interference fit. The degree of interference can be selected merely to afford uniform perssure transmission through the wall, or to induce a favorable residual stress pattern in the wall. Although these vessels avoid the pressure limitations which material thickness imposes on the monoblock vessel, they possess certain inherent disadvantages of their own. Chief among these is the fact that they require accurate machining to close tolerances in order to control the interference fit between the outside diameter of each layer and the inside diameter of the adjacent encircling layer. In cases where the vessel is long, for example, 20 or 30 feet or more, and the layers are relatively thin, the problem of maintaining the required degree of machining tolerance is very difficult, if not impossible, to solve, and can cause large increases in stresses. Even when the shrink fit is not intended to produce a residual stress pattern, the tolerance problem is of major importance because it is essential, in order to obviate localized bending, to insure that adjacent layers are in intimate contact at all points. Another disadvantage is the fact that assembly of a shrink fit vessel requires heating of the layer, and, if a large degree of overlap or interference is required for the desired residual stress pattern, this could be detrimental to the material from which the layers are made. Furthermore, the assembly process can produce axial stresses of unpredictable magnitude in the layers which adversely affect the stress analysis of the vessel.

It also should be noted that, since the shrink fit process is not applicable to the formation of hemispherical or other related shapes of vessel end closures, both types of vessel mentioned above must use solid end closures, usually forgings. These closures are massive and difficult to fabricate, and therefore further complicate the manufacturing and transportation problems.

The object of this invention is to provide improved pressure vessels and end closures therefor which eliminate the problems of manufacture characterizing the monoblock and shrink fit vessels, which afford a pressure-handling capability at least as high as the ideal shrink fit vessel, and which afford other advantages not obtainable with the prior designs. According to the invention, the vessel comprises a plurality of superposed preformed layers of steel or like high strength material, in the form of cylinders or spheres, between each adjacent pair of which is interposed a confined layer of metal, termed fill metal, which is formed in situ in the molten state and which fills completely the space between the preforms. The preformed layers are fitted together with a minimum clearance between layers, but without the interference fit characteristic of the shrink fit vessel. Therefore, accurate machining is not necessary. The fill metal has a melting point much lower than that of steel, and generally on the order of 300° to 500° F., and is introduced under a selected pressure which insures that all voids between the preformed layers are filled when the vessel is at operating temperature. The filling pressure may be so selected that the fill metal is essentially unpressurized when the internal pressure of the vessel is zero. In this case, the fill layers serve merely to transmit uniformly from preform to preform the pressure loading produced when the vessel is under operating conditions. In other words, this version of the invention can be thought of as a monoblock vessel in which the stresses on average conform to the Lamé equations. However, unlike the monoblock vessel, the pressure-handling capability of the improved vessel is not dependent upon the relationship between allowable stress versus thickness for the preforms; that is, since each layer can be hardened individually, the entire vessel is strength hardened to the same degree as any layer. In a second version of the invention, the fill metal layers are pressurized initially an amount sufficient to produce a desirable residual stress pattern in the vessel wall. This embodiment creates a shrink fit vessel, as far as pressure-handling capability is concerned, but of course it avoids the extreme machining tolerance problems of the usual shrink fit vessel and affords a much surer way of predicting stresses.

The principles of the invention can be applied to spheres as well as cylinders, and therefore, the invention provides, for the first time, a scheme for producing a layered hemispherical or similar curved end closure for a pressure vessel. Such a structure not only possesses inherent value, because it eliminates the necessity for using solid, massive forgings, but, as discussed below, the use of such a closure with the layered vessel avoids the limitation on internal pressure normally imposed by axial stress considerations.

Although many of the advantages of this invention will already be obvious to those skilled in the art, it seems desirable to present here the following summary of the more important ones:

(1) Final filling and prestressing of the vessel, including the end closure, can be effected at the site of use.

(2) The thickness of each preformed layer is but a fraction of the total wall thickness, and therefore these layers are easier to form and can employ materials with higher allowable stresses than the wall of a monoblock vessel.

(3) The accurate machining and high heating temperatures required for shrink fits are eliminated.

(4) The fill metal which is interposed between the preformed layers serves to dissipate shock loads and thus tends to minimize failure due to explosions within the vessel.

(5) In cases where radiation shielding is required, the fill metal can be lead or a lead alloy. Thus, this fill metal can perform the shielding function in addition to its normal pressure-transmitting function.

(6) In cases where residual stresses are imposed by means of the fill metal, the vessel can have less mass or a higher operating pressure than the monoblock vessel, and will be more reliable and more efficient than the shrink fit vessel. Furthermore, the present scheme makes it easier to predict with accuracy the stresses in the vessel wall because fill pressure is much easier to control than machining tolerance.

(7) If the prestressed version is subjected to conditions, such as implosions, which locally destroy the prestress, the vessel can be salvaged by simply reheating the damaged area and filling the void with additional metal. This is in direct contrast to the shrink fit vessel wherein localized destruction of the prestress renders the vessel useless.

The invention is described herein in detail with reference to the accompanying drawings in which:

FIG. 1 is a longitudinal sectional view of a typical two-layered vessel of the type provided by the present invention.

FIG. 2 is a schematic diagram of the set-up used to fill a two-layer vessel of the type shown in FIG. 1.

Figure 3:
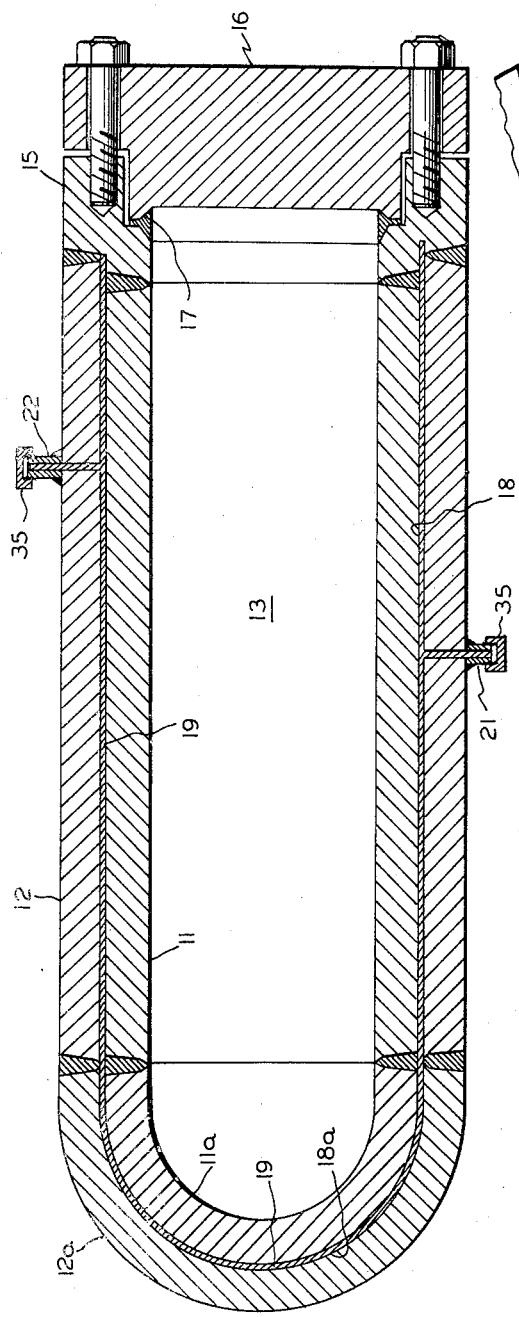
FIG. 3 is a longitudinal section of an embodiment of the present invention employing a floating head.

The vessel shown in FIG. 1 comprises two superposed cylindrical layers 11 and 12 which encircle the pressure chamber 13 and which are welded at their opposite ends to forge ring 14 and forged flange member 15. The left end of chamber 13 is closed by a pair of superposed, curved layers 11a and 12a. These layers can be hemispherical, as shown, or elliptical, or have some special curved shape. The right end of chamber 13 is closed by a full-opening forged cover 16 which is bolted to flange member 15. The joint between the cover 16 and the flange member 15 is provided with a metal seal 17, which is a Grayloc seal manufactured by the Gray Tool Company. An O-ring seal or any other seal could be used depending upon requirements. The two cylindrical layers 11 and 12 are spaced radially from each other to define a closed, intervening chamber 18, and a similar chamber 18a is provided between the curved layers 11a and 12a. These chambers are completely filled by a metal 19 which is introduced in the molten state. In a typical vessel wherein the inside diameter of layer 11 is five feet, and each of the layers has a thickness of about six inches, the thickness of the fill metal layer 19 is on the order of a minimum of one-eighth inch and an average of about one quarter of an inch.

The layers 11, 12, 11a and 12a, the forged members 14 and 15 and the cover 16 are made of steel; the layers preferably being a high strength, low alloy steel, such as T-1, A-387D or HY-100. Layers 11, 12, 11a and 12a may also be made of the austenitic stainless steels, such as 304 or 321, the very high strength martensitic 301 stainless steel, or the maraging steels. Although the austenitic stainless steels have fairly high coefficients of thermal expansion, the analysis which is presented later shows this is not of too great importance. For purposes of the present disclosure, it is assumed that the cylindrical and curved layers are made of HY-100. This is a low alloy steel containing about 3% nickel and 1½% chromium, and, in thicknesses of six inches or less, it has a tensile strength of 115,000 p.s.i., and an 0.2% offset yield strength of 100,000 p.s.i. It has a modulus of elasticity of $30 \times 10^6$ p.s.i., a Poisson's ratio of 0.3, and, in the temperature range between ambient temperature and the freezing temperature of the fill metal 19, i.e., between about 70° F. and 300° F., its coefficient of thermal expansion is $6.2 \times 10^{-6}$ in./in./° F.

Various considerations enter into the selection of the fill metal 19. The following are the more important ones:

(1) The fill metal must not chemically attack or otherwise adversely affect the metal used in layers 11, 12, 11a and 12a under the temperatures and pressures encountered during either filling of chambers 18 and 18a or use of the vessel.

(2) The temperature at which the fill metal becomes molten must be low enough to prevent harm to the metal used in the preformed layers. This temperature should also be one that can be attained easily and maintained substantially uniform throughout the extents of chambers 18 and 18a.

(3) The change in volume of the fill metal during freezing must be ascertained and its effect taken into account in the manner explained in Appendix A. In general, it is desirable to use a fill metal which expands during solidification because this tends to minimize the creation of voids in the fill chamber. However, metals which shrink on freezing can be used if they are introduced under pressure.

(4) The coefficient of thermal expansion of the fill metal must be fairly close to that of the metal used in layers 11, 12, 11a and 12a, because vastly different coefficients could result either in the creation of voids or in the production of excessive, or at least unknown, loading pressures. The analysis of Appendix A also shows one way of handling this effect. As in the case of the change in volume on freezing, the main cure for voids is pressurization during filling.

(5) As shown in Appendix B, at very high pressures the fill metal acts as a fluid. Because of this, efficient transfer of pressure between the steel preformed layers requires that the fill metal be as incompressible as practicable. The bulk modulus of a solid material is the measure of its incompressibility, and therefore this property should have a relatively high value. This, in turn, means that the fill metal should have a high Poisson's ratio and a high modulus of elasticity.

(6) Since it is essential that there be no voids in fill chambers 18 and 18a, the fill metal must possess the ability to flow into and completely fill very narrow spaces.

(7) The fill metal thickness varies to a greater or lesser extent depending upon the fabrication procedure, and this, in turn, depends upon the requirements of the pressure vessel. Since the thickness of each preformed layer is large relative to the thickness of the fill metal, the surface of each preformed layer moves fairly uniformly under vessel internal pressure. Thus, the variation in fill thickness causes a variation in fill pressure. If local "thin" spots of fill metal occur, an excessively high local pressure may be avoided if the yield point of the fill metal is low.

Various metals, such as lead, satisfy many of these requirements, but certain bismuth alloys are considered best at the present time. Of these alloys, one known as Cerrocast which is marketed by the Cerro Corporation, and which has a nominal composition of 40% bismuth and 60% tin, is preferred. Its pertinent properties are as follows:

Specific weight—0.296
Melting point—begins at 315° and is complete at 340°
Change in volume on melting—very small
Linear coefficient of thermal expansion—average value of $8.3 \times 10^{-6}$ in./in./° F.
Modulus of elasticity—$6 \times 10^6$ p.s.i.
Poisson's ratio—0.375
0.2% tensile yield strength—6000 p.s.i.

Although the bismuth-tin alloy will attack carbon steels at temperatures above 450° F., because of the presence of tin, usually there is no need to use such a high temperature during the filling operation. Therefore, the chemical effects requirement normally is satisfied. Of course, if temperatures above 450° F. are encountered during either filling or use of the vessel, bismuth-lead alloys, such as the Cerrobase alloy marketed by the same company, may be substituted. The melting temperature of Cerrocast is low enough to preclude harm to the steel layers, and it can be attained easily and inexpensively in many locations around the world. Cerrocast neither contracts nor expands appreciably on freezing, so voids can be easily avoided, and its coefficient of thermal expansion is close enough to that of steel to avoid any problems of differential thermal expansion. Finally, it will be noted that Cerrocast has a high elastic modulus and a high Poisson's ratio, and therefore a high compressibility, and it has the property of "wetting" surfaces so that it can fill extremely small spaces.

In the final fabrication of the vessel, the preformed layers 11, 12, 11a and 12a, and the forgings 14 and 15 are first machined to provide the proper weld configurations and openings for vessel connections, such as the fill and vent pipes 21, 21a and 22, 22a, and any other penetrations required for control or monitoring purposes. Where possible, the fill and vent connections are located, respectively, at the lowest and highest points of the fill chambers 18 and 18a. If this arrangement cannot be used, the vessel must be tilted during the filling operation so that the fill metal can displace all of the air from these chambers. The preformed layers are now welded to the forgings. As each weld is completed, it is dressed, checked for surface defects by means of a dye penetrant or magnetic particle test, and then radiographed. The vessel connections are now welded in place and, as far as possible, these welds are checked in the same way. When this work is complete, the assembly is stress relieved, and, if required, the forgings are prestressed by encircling them with shrink fit, forged rings 23.

When the vessel is small enough, it is placed in a furnace 24 and filled using the set-up shown in FIG. 2. In this case, the fill pipes 21 and 21a are connected with sumps 25 and 25a, respectively, which are located sufficiently above the vessel to provide the gravity heads required for the filling operation, and which are charged with enough of the fill metal 19 to completely fill the two chambers 18 and 18a and still maintain visible metal levels in the sumps. The spaces in the sumps above the metal charges are connected with pipes 26 and 26a which lead outside furnace 24 to vent lines 27 and 27a and a pressurized gas bottle 28. The vent connections and the bottle 28 are provided with shut-off valves 29, 29a and 31, respectively, and the gas pressures delivered to the sumps are controlled by a pair of pressure regulators 32 and 32a. Vent pipes 22 and 22a, leading from the upper sides of the chambers 18 and 18a, extend outside furnace 24 and are equipped with shut-off valves 33 and 33a which are operated by reach rods 34 and 34a.

When the set-up shown in FIG. 2 is complete, and each sump has been charged, furnace 24 is closed, valves 29, 29a, 33 and 33a are opened, and valve 31 is closed. The temperature in furnace 24 is now raised to a value above the melting point of the fill metal 19 to cause the charges in sumps 25 and 25a to melt and flow by gravity into chambers 18 and 18a. The air displaced by the fill metal escapes through vent lines 22 and 22a, thereby permitting this metal to completely fill the chambers and overflow into the vent pipes. When the charges are completely melted, the level of the molten metal in each vent pipe will be the same as the level in the associated sump. If it is found impractical to use sumps large enough to hold initially all of the fill metal required to completely fill chambers 18 and 18a, the sumps are located near the furnace door so that additional fill metal can be added during the melting operation. After chambers 18 and 18a are completely filled, vent valves 29, 29a, 33 and 33a are closed, and valve 31 is opened to place the molten bodies of fill metal under pressures determined by the settings of regulators 32 and 32a. The pressure applied to sump 25 is selected in accordance with the analysis presented in Appendix A, and the pressure applied to sump 25a is selected in accordance with a similar analysis which considers the hemispherical shape of chamber 18a. In each case, the selected pressure insures that no voids will be created in the fill chambers as a result of temperature effects, when the vessel is subsequently cooled to operating temperature. The furnace now is turned off and the vessel is allowed to cool while the fill metal is maintained under pressure. When the temperature has decreased sufficiently, the vessel is removed from the furnace, and the fill and vent lines 21, 21a and 22, 22a are cut off at points below the levels of the metal remaining in sumps 25 and 25a. The ends of the portions of these pipes attached to the vessel are now threaded and then provided with pressure caps 35 (see FIG. 1). As a final check, the entire vessel is radiographed to make certain that there are no voids in either fill chamber.

The filling pressure required to create merely a thick walled vessel usually is fairly low, so bottled gas is adequate, and the pipes 21, 21a, 22 and 22a can be cut and capped after the metal has frozen without fear of permitting extrusion of the fill metal. Using the analysis of Appendix A, the pressure required to fill the annular space 18 in the illustrated example is about 67 p.s.i., assuming that the fill layer is to be unpressurized at the vessel-operating temperature of 70° F.

In cases where extrusion is likely, or it is desired to pressurize the fill layers 19 so as to produce a favorable initial stress pattern through the vessel wall, the gas bottle 26 is replaced by a pump, and the pressurizing medium is a thermally stable fluid rather than a gas. In these cases, the fill and vent lines 21, 21a, 22 and 22a are not cut and capped, but are closed by valves which are positioned close to the vessel and which are shut while the fill metal is fully molten and under the prescribed pressure. After the vessel has cooled, and the fill metal has solidified, the portions of the fill and vent lines at the sides of the valves opposite the vessel connections are disconnected, and, as an extra precaution, the open ports of the valves are then plugged. Thus, the shut-off valves, in effect, become an integral part of the vessel. Since, in this case, the metal freezes after the shut-off valves are closed, the charging pressure must be so selected that it takes into account expansion or contraction of the fill metal, whichever is the case, during freezing. Also, the pressure used to prestress the vessel must not be so great as to collapse the inner walls 11, 11a. With regard to the wall 11, the critical pressure limit can be obtained from Bresse's equation for collapse of a cylinder under external pressure, which is written as $$P = \frac{2E}{1-\nu^2}\left(\frac{t}{d}\right)^3$$

where $t$ and $d$ are the thickness and inside diameter, respectively, of wall 11, and $E$ and $\nu$ are the elastic modulus and Poisson's ratio, respectively, of the material used in this wall. Experience indicates that the collapse pressure predicted by this equation is about 25% higher than the actual collapsing pressure, and therefore a corresponding safety factor should be used. By the use of the corresponding equation for a sphere, the critical collapse pressure for wall 11a can be determined.

Vessels having a plurality of radially spaced metal fill layers in either the spherical head or the cylindrical body, or in both of these regions, are filled in essentially the same way as the simple vessel of FIG. 1. In this case, however, the various radially spaced fill chambers are filled and pressurized in sequence.

FIG. 3 shows an embodiment of the invention employing a floating head. In this vessel, the curved end layers 11a and 12a are welded directly to the cylindrical layers 11 and 12 so that the fill chambers 18 and 18a communicate freely with each other. This combination of a metal-filled closure and metal-filled cylinder is particularly advantageous in cases where the fill metal is used to prestress the vessel because it reduces the axial stress in each of the cylindrical steel layers 11 and 12, and thereby enables this stress to remain intermediate the radial and tangential stresses as the ratio of vessel external diameter to vessel internal diameter increases. The problem presented by the axial stress is discussed in detail in my paper entitled "Design and Analysis of Commercial Pressure Vessels to 500,000 p.s.i.," paper No. 65–WA/PT–1, presented at the ASME Winter Meeting in November, 1965. In that paper it is shown that the critical ratio of external to internal diameter for a shrink fit vessel having a solid closure is 2.22, and that the internal pressure is limited to a value equal to the chosen design stress intensity. In contrast, it also is shown that, in a vessel, such as the FIG. 3 embodiment of the present invention, which has a floating head or end closure, the axial stress always is intermediate the tangential and radial stresses, and that theoretically the ratio of internal pressure to design stress intensity is limitless. While we realize that this analysis does not support a conclusion that a real metal-filled vessel with a floating head can contain an infinite pressure, because obviously problems of reverse yielding will present a limit as the ratio of external to internal diameter increases, it does indicate that this combination avoids the limitation on internal pressure imposed by axial stress considerations, and that it permits containment of higher pressures than would otherwise be possible.

In spite of the advantage just mentioned, and the fact that the use of a floating head simplifies fabrication procedures in vessels having three or more superposed, preformed layers, the FIG. 3 vessel is not presently as attractive as the FIG. 1 vessel. The main reason for this is that that analysis of the FIG. 3 vessel must treat the interaction between each cylindrical layer and the attached curved end closure. A satisfactory, combined analysis of these two portions of each vessel layer is so complex that it is considered impractical using today's theories and computer techniques. An empirical design approach may be acceptable in some limited cases, but this approach obviously cannot be used for large vessels which operate at very high pressures. Another disadvantage of the floating head embodiment stems from the fact that the cylindrical and spherical fill chambers are necessarily pressurized to the same level. Since, in the normal case, the ideal pressures for these two chambers are not equal, it is apparent that the design of the floating head vessel must involve a compromise.

Appendices A, B and C analyze the thermal and pressure effects in the cylindrical portion of a typical two-layered vessel of the type illustrated in FIG. 1 in which the axial strain behavior of the two preformed layers is identical. The hemispherical head of FIG. 1 can be analyzed in a similar manner, except that here there is no problem of intermediate stress because two of the three principal stresses at any point in a spherical wall are identical. These analyses are based on the assumption that the fill metal has a constant thickness. If the thickness does vary, it should be realized that there will be accompanying variations in the pressure at the interface between the preformed layer and the fill layer. The pressure variations will be most severe in cases where the preformed layer is sufficiently thick relative to the fill metal that the surface displacements of the fill layer are uniform. Here, the pressure varies essentially in inverse relation to the fill thickness if the parts behave in an elastic manner. Therefore, theoretically the pressure will increase without bound as the fill layer becomes thinner. This increase can be limited by insuring the presence of a minimum, finite fill thickness. Furthermore, if the fill metal has a relatively low yield stress, it will flow plastically in localized regions before excessively high pressure variations can be created. In the extreme case where yield strength is zero, the fill metal acts as a fluid and, therefore, the pressure necessarily remains uniform.

Figure 4:
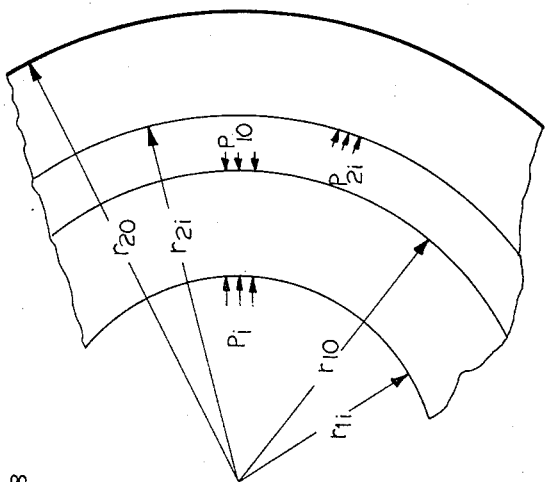
FIG. 4 is a partial cross sectional view of the vessel shown in FIG. 1 showing the dimensions and pressures used in the analyses of the appendices.

The following analyses are based on the cross section of FIG. 4, and use the following nomenclature:

$$C_1 = -\left[\frac{(1-\nu_s)r_{1o}^3}{E_s(r_{1o}^2-r_{1i}^2)} + \frac{(1+\nu_s)r_{1i}^2 r_{1o}}{E_s(r_{1o}^2-r_{1i}^2)}\right]$$

$$C_2 = \left[\frac{(1-\nu_s)r_{2i}^3}{E_s(r_{2o}^2-r_{2i}^2)} + \frac{(1+\nu_s)r_{2o}^2 r_{2i}}{E_s(r_{2o}^2-r_{2i}^2)}\right]$$

$$C_3 = \frac{r_{2i}^2(r_{2o}^2+r_{2i}^2)}{(r_{2o}^2-r_{2i}^2)(r_{2i}^2-r_{1o}^2)}$$

$$C_4 = \frac{r_{1o}^2(r_{1o}^2+r_{1i}^2)}{(r_{1o}^2-r_{1i}^2)(r_{2i}^2-r_{1o}^2)}$$

$C_5$ = constant of integration
$d$ = derivative
$E$ = modulus of elasticity
$H$ = constant axial strain, i.e. $H = H(r)$
$K$ = bulk modulus
$L$ = length of cylinder
$p$ = pressure
$r$ = radial coordinate
$T$ = absolute temperature difference between the temperature considered and the base operating temperature
$U$ = radial displacement
$V$ = volume per inch of length
$Y$ = yield strength
$\alpha$ = coefficient of thermal expansion
$\beta$ = coefficient of cubical expansion (increase is +liquid-to-solid, i.e., expansion on freezing is positive)
$\Delta$ = change in
$\epsilon$ = strain $\mu$=coefficient of dry friction
$\nu$=Poisson's ratio
$\sigma$=stress
$\int$=integral Subscripts $a$=operating temperature
$b$=temperature other than basic operating temperature at which fill remains solid
$c$=fill material
$f$=fluid
$F$=maximum axial force permitted by static friction
$i$=inside surface of a vessel
$m$=melting temperature of fill metal
$o$=outside surface of a vessel
$r$=radical
$s$=steel
$t$=tangential
$z$=axial
$1$=inner cylinder
$2$=outer cylinder
$I$=increment of internal pressure
$II$=increment of metal fill pressure

APPENDIX A.—ANALYSIS OF THERMAL EFFECTS

This discussion treats two major thermal effects on the vessel; one being the change in volume which occurs during freezing of the fill metal, and the other being the differential expansion or contraction of the fill metal and the steel layers which occurs first, as the temperature changes from the filling temperature to the operating of the vessel, and second, as the operating temperature of the vessel changes. In all cases, it is considered that the pressure in the fill metal depends solely upon the pressure applied during the filling step and upon the fact that the fill metal is in a closed space whose boundaries expand and contract unequal amounts. Although material properties do vary with temperature, the range of temperatures generally used with the specified fill metals, such as the Bi-Sn or Bi-Pb alloys, are such that it can safely be assumed that the properties of the steels used in the preformed layers 11 and 12 remain constant. Therefore, it is assumed that the modulus of elasticity, Poisson's ratio, yield strength, tensile strength, and coefficient of thermal expansion of the steel do not vary with temperature. As far as the fill metal 19 is concerned, there are changes of properties in the range of temperatures considered. An obvious change is the phase change. The assumptions concerning each property are individually considered.

It is also assumed that a pressure may be applied to the fill metal 19 when it is molten, and that the fill space is closed after the filling step so that the mass of the fill metal is the same in the solid state as it is in the fluid state when under pressure. Thus, if the fill metal expands on freezing, the pressure increases, and, if it shrinks on freezing, the pressure decreases. The lower limit of the pressure in the fill space is taken to be zero because at any pressure below this the space would no longer be full.

In general, the method of analysis involves a comparison of the volumes of the fill space 18 and the fill metal 19, and a determination of the relative change in these volumes produced by fill pressure and temperature variations. The problem is approached from the end product, i.e., the operating conditions of the vessel are taken as the starting point.

The longitudinal pressure of the fill metal 19 is very low and acts on an annulus whose area is small compared to the thickness of the steel layers. Therefore, the axial displacement caused by this force is small compared to the displacement caused by thermal expansion and can be neglected. This may be verified for a particular problem by the use of the pressure calculations in Equations A-19 through A-21.

A.1 Variation in fill pressure to operating temperature variations

In calculating the volume of the space 18 between the inner and outer steel layers 11 and 12 at the normal operating temperature and pressure $p_a$, the analysis is simplified if it is assumed that the pressure acts uniformly through the fill metal even when the latter is solidified. The error in the temperature calculations resulting from this assumption should be very small. It is also assumed that the two steel layers are elastic cylinders, that the inner cylinder is subjected to external pressure and the external cylinder is subjected to internal pressure, and that the basic dimensions are those of an unpressurized cylinder at the normal operating temperature of the vessel. Since there are no relative axial displacements, the volume of the fill space 18 per inch of length may be written as $$V_a = \pi[(r_{2i}+C_2 p_a)^2 - (r_{1o}+C_1 p_a)^2] \quad \text{(A-1)}$$

where $C_1$ and $C_2$ are determined from the simple displacement calculations due to pressure on each cylinder.

By eliminating the squares of small quantities, and assuming that $C_2 p_a \ll r_{2i}$ and $C_1 p_a \ll r_{1o}$, Equation A-1 can be simplified and written as $$V_a = \pi[r_{2i}^2 - r_{1o}^2 + 2(r_{2i} C_2 - r_{1o} C_1) p_a] \quad \text{(A-2)}$$

If the temperature is now changed an amount $\Delta T_b$ to a second solid phase temperature $T_b$, the volume $V_b$ of the fill space 18, expressed in terms of the basic dimensions, becomes $$V_b = \pi[(r_{2i}+C_2 p_b)^2 - (r_{1o}+C_1 p_b)^2](1+\alpha_s \Delta T_b)^3 \quad \text{(A-3)}$$

where $p_b$ is the pressure of the fill metal at the second solid phase temperature $T_b$. If the assumption is made that $C_2 p_b \ll r_{2i}$ and that $C_1 p_b \ll r_{1o}$, and that $\alpha_s \Delta T_b$ is much smaller than 1, then by using Equation A-2 and A-3 the expression for $V_b$ may be simplified and written as $$V_b = [V_a + 2\pi(r_{2i} C_2 - r_{1o} C_1)(p_b - p_a)][1 + 3\alpha_s \Delta T_b] \quad \text{(A-4)}$$

If the squares of small quantities are again neglected, the result may be written $$V_b - V_a = 3V_a \alpha_s \Delta T_b + 2\pi(r_{2i} C_2 - r_{1o} C_1)(p_b - p_a) \quad \text{(A-5)}$$

The volume of the fill metal 19 at pressure $p_a$ and the normal operating temperature must be the same as the volume $V_a$ of the space 18 between the steel cylinders and can be expressed by Equation A-1. On the other hand, as a result of thermal expansion and change in compressibility of the fill metal, the volume $V_b'$ of the fill metal at pressure $p_b$ and at the new temperature $T_b$ may be expressed as $$V_b' = V_a \left(1 + \int_0^{\Delta T_b} \alpha_c dT\right)^3 \left(1 + \frac{p_a}{K_{ca}}\right)\left(1 - \frac{p_b}{K_{cb}}\right) \quad \text{(A-6)}$$

The value of $\alpha_c$, which is the coefficient of thermal expansion of the fill metal, must be measured from the operating temperature. However, this result usually can be approximated by a constant in the temperature range being considered. Therefore, the value of the integral in Equation A-6 can be taken to be $\alpha_c \Delta T_b$. Since this quantity $\alpha_c \Delta T_b$ is small with respect to 1, the term $$(1+\alpha_c \Delta T_b)^3$$

may be closely approximated by $1 + 3\alpha_c \Delta T_b$. Finally, since the product of $p_a/K_{ca}$ and $p_b/K_{cb}$ is small compared to either quotient, it may be neglected. By making these assumptions, Equation A-6 becomes $$V_b' = V_a(1 + 3\alpha_c \Delta T_b)\left(1 + \frac{p_a}{K_{ca}} - \frac{p_b}{K_{cb}}\right) \quad \text{(A-7)}$$

If it is now assumed that changes in volume are small with respect to the initial volume, the product of $$(p_a/K_{ca} - p_b/K_{cb})$$

and $3\alpha_c\Delta T_b$ may be neglected and the result written as $$V_b' - V_a = 3\alpha_c\Delta T_b V_a + \left(\frac{p_a}{K_{ca}} - \frac{p_b}{K_{cb}}\right)V_a \quad \text{(A-8)}$$

Since the volume $V_b$ of the fill space 18 is equal to the volume $V_b'$ of the fill metal 19, the relationship between $p_b$ and $p_a$ for given values of $V_a$, $\alpha_c$, $\Delta T_b$, $K_{ca}$ and $K_{cb}$ may be determined. If Equation A–5, which gives the change in volume of the fill space, is set equal to Equation A–8, which gives the change in volume of the fill metal, and it is assumed that the modulus of elasticity and Poisson's ratio do not change (i.e., $K_{cb} = K_{ca}$), the result may be written as $$3\Delta T_b(\alpha_c - \alpha_s) = (p_b - p_a)\left[\frac{1}{K_c} + \frac{2\pi(r_{2i}C_2 - r_{10}C_1)}{V_a}\right] \quad \text{(A-9)}$$

where it will be understood that $K_c$ is the bulk modulus of the fill metal at both of the temperatures $T_a$ and $T_b$. By using the definitions of $C_1$ and $C_2$ given previously, the last term in the bracket on the right side of Equation A–9 becomes $$\frac{2\pi}{EV_a}\left[\frac{r_{2i}^2(r_{20}^2 + r_{2i}^2)}{(r_{20}^2 - r_{2i}^2)} + \frac{r_{10}^2(r_{10}^2 + r_{1i}^2)}{(r_{10}^2 - r_{1i}^2)} + \nu_s(r_{2i}^2 - r_{10}^2)\right] \quad \text{(A-10)}$$

If it is assumed that the fill metal 19 is introduced under a pressure such that $p_a$ at the normal operating temperature is zero, then $$V_a = \pi(r_{2i}^2 - r_{10}^2) \quad \text{(A-11)}$$

Although this may appear to be a fairly severe restriction, actually it is not. The reason for this is that if there is a pressure $p_a \neq 0$, it may also be directly added to all other pressures, i.e., the pressure at any temperature other than operating temperature. However, if the added $p_a$ is very large, the use of Equation A–11 is questionable. In the analysis presented herein, the pressure $p_a$ should not be very large.

With $p_b$ equal to zero, Equations A–9, A–10 and A–11 can be combined to give the following expression for the fill pressure at an operating temperature other than the normal operating temperature:

$$3\Delta T_b(\alpha_c - \alpha_s) = P_b\left[\frac{1}{K_c} + \frac{2}{E_s}(C_3 + C_4 + \nu_s)\right] \quad \text{(A-12)}$$

Each of the terms $C_3$ and $C_4$ has a value on the order of $10^3$ or more for vessels of the size of the FIG. 1 embodiment, so these terms are large with respect to $\nu_s$. Also, the product of $2/E_s$ and $(C_3+C_4)$ is large with respect to the term $1/K_c$. Because of this, Equation A–12 may be written in its final form as $$P_b = \frac{3}{2}\Delta T_b \frac{E_s(\alpha_c - \alpha_s)}{C_3 + C_4} \quad \text{(A-13)}$$

A.2 Variation in fill pressure due to change of phase

If it is assumed that the fill metal expands as it freezes, the volume of the fill metal in the fluid state, expressed in terms of the initial volume $V_a$, can be written as $$V_{mf}^1 = \frac{V_a(1 + 3\alpha_c\Delta T_m)\left(1 + \frac{p_a}{K_{ca}}\right)\left(1 - \frac{p_{mf}}{K_{cmf}}\right)}{(1+\beta)} \quad \text{(A-14)}$$

where:

$\Delta T_m$ is the difference between the normal operating temperature of the vessel and the melt temperature of the fill metal.

$K_{cmf}$ is the bulk modulus of the fill metal in the fluid state at the melt temperature.

$\beta$ is the coefficient of cubic expansion in the phase change from the liquid to the fluid state.

$V_{mf}'$ is the volume of the fill metal 19 as a fluid at melt temperature.

By neglecting higher order terms of small quantities, Equation A–14 may be rewritten as $$V_{mf}^1 - V_a = 3\alpha_c\Delta T_m V_a + \left(\frac{p_a}{K_{ca}} - \frac{p_{mf}}{K_{cmf}}\right)V_a - \beta V_a \quad \text{(A-15)}$$

The pressure of the fill metal 19 at the melt temperature can be expressed in terms of the pressure at the operating temperature of the vessel using Equation A–5 and substituting $T_m$ for $T_b$, $V_m$ for $V_b$ and $p_{mf}$ for $p_b$, where $V_m$ is the volume of the space 18 between the steel cylinders 11 and 12 at the melt temperature, $p_{mf}$ is the pressure in the fluid state of the fill metal 19 at the melt temperature. The revised form of Equation A–5 may then be combined with Equation A–15, such that $V_m = V_{mf}'$. The result may be written as $$\left(\frac{p_a}{K_{ca}} - \frac{p_{mf}}{K_{cmf}}\right)V_a - 2\pi(r_{2i}C_2 - r_{10}C_1)(p_{mf} - p_a) =$$
$$3V_a\Delta T_m(\alpha_s - \alpha_c) + \beta V_a \quad \text{(A-16)}$$

As before, this result can be kept perfectly general even if $p_a \neq 0$, because $p_a$ may subsequently be added to each pressure. Thus, if $p_a = 0$, Equations A–11 and A–16 can be combined to provide the following expression for $p_{mf}$ $$p_{mf} = -\frac{3\Delta T_m(\alpha_s - \alpha_c) + \beta}{\left\{\frac{1}{K_{cmf}} + \frac{2}{E_s}\left[\frac{r_{2i}^2(r_{20}^2 + r_{2i}^2)}{(r_{20}^2 - r_{2i}^2)(r_{2i}^2 - r_{10}^2)} + \frac{r_{10}^2(r_{10}^2 + r_{1i}^2)}{(r_{10}^2 - r_{1i}^2)(r_{2i}^2 - r_{10}^2)} + \nu_s\right]\right\}} \quad \text{(A-17)}$$

For the values considered in this analysis, the bracketed term in the denominator is large compared to $1/K_{cmf}$. Hence, the effect of the variation of $K_{cmf}$ on $p_{mf}$ is very small. Also, $\nu_s$ is small relative to the other terms in the bracket. Therefore, Equation A–17 may be rewritten as $$p_{mf} = \frac{3\Delta T_m E_s(\alpha_c - \alpha_s) - \beta E_s}{2(C_3 + C_4)} \quad \text{(A-18)}$$

A.3 Axial strain of the steel cylinders resulting from pressure $p_{mf}$ acting in the fill space When the pressure vessel is vented, i.e., the pressure within the inner cylinder 11 is zero, axial force equilibrium of the cylinders leads to an expression which may be written as $$\sigma_{Z1}(r_{10}^2 - r_{1i}^2) + \sigma_{Z2}(r_{20}^2 - r_{2i}^2) = p_{mf}(r_{2i}^2 - r_{10}^2) \quad \text{(A-19)}$$

where $\sigma_{Z1}$ and $\sigma_{Z2}$ are the axial stresses in the inner and outer cylinders 11 and 12, respectively. If it is assumed that the end closure for the vessel is solid, i.e., not layered, the axial strain of both steel cylinders is the same. As will be shown subsequently below (see Equation B–8), the relationship may be written as $$\frac{1}{E_s}\left[\sigma_{Z1} + \frac{2\nu_s p_{mf} r_{10}^2}{r_{10}^2 - r_{1i}^2}\right] = \frac{1}{E_s}\left[\sigma_{Z2} - \frac{2\nu_s p_{mf} r_{2i}^2}{r_{20}^2 - r_{2i}^2}\right] \quad \text{(A-20)}$$

If Equations A–19 and A–20 are solved simultaneously, $\sigma_{Z1}$ and $\sigma_{Z2}$ can then be computed. The axial strain may then be determined from $$\epsilon_Z = \frac{1}{E_s}\left[\sigma_{Z1} + \frac{2\nu_s p_{mf} r_{10}^2}{r_{10}^2 - r_{1i}^2}\right] \quad \text{(A-21)}$$

APPENDIX B.—ANALYSIS OF PRESSURE EFFECTS

This analysis is concerned with determining the radial pressure distribution and the stress pattern through the wall thickness of a two-layered vessel. It is assumed for the analysis of Appendix B that at zero internal pressure there are no stresses at operating temperature. The addition of shrink fit stresses in the fill layer is discussed in Appendix C. The analysis assumes that the steel cylinders 11 and 12 always are elastic, but treats three separate conditions of the assumed uniform thickness fill metal 19. These conditions are: (a) That the fill metal is elastic; (b) that the fill metal is elastic-plastic, or fully plastic with elastic axial behavior; and (c) that the fill metal acts as a fluid.

B.1 Fill metal acts elastically

This portion of the analysis is based upon the following assumptions: (a) That the vessel is closed; (b) That the longitudinal forces developed by internal pressure acting on the closure will be resisted only by the cross-section of the steel cylinders 11 and 12. In other words, the longitudinal force of the fill metal 19 is negligible in comparison to that of the steel cylinders; (c) That the axial strains of the two steel cylinders 11 and 12 are equal and do not vary with radius; and (d) That the axial strain of the fill metal cylinder is the same as that of the steel cylinders. In other words, the axial strain of the fill metal 19 is determined by that of the steel, and the axial stress of the fill metal is determined from its strain.

Since the steel cylinders 11 and 12 act elastically, the tangential and radial stresses can be computed from the Lamé equations. At the outer radius of the inner cylinder 11, the tangential and radial stresses in the inner cylinder are expressed by the following equations:

$$\sigma_{t1}\big]_{r=r_{10}} = \frac{2r_{1i}^2 p_i - (r_{1i}^2 + r_{10}^2)p_{10}}{r_{10}^2 - r_{1i}^2} \quad \text{(B-1)}$$

$$\sigma_{r1}\big]_{r=r_{10}} = -p_{10} \quad \text{(B-2)}$$

At the inner radius of the outer cylinder, the Lamé tangential and radial stresses in the outer cylinder 12 may be written $$\sigma_{t2}\big]_{r=r_{2i}} = \frac{(r_{20}^2 + r_{2i}^2)p_{2i}}{r_{20}^2 - r_{2i}^2} \quad \text{(B-3)}$$

$$\sigma_{r2}\big]_{r=r_{2i}} = -p_{2i} \quad \text{(B-4)}$$

From Hooke's Law, the axial strain in the inner cylinder 11 may be written $$E_s \epsilon_{z1} = \sigma_{z1} - \nu_s(\sigma_{t1} + \sigma_{r1}) \quad \text{(B-5)}$$

Using the expressions for the tangential and radial stresses given by Equations B-1 and B-2, the axial strain $\epsilon_{z1}$ of the inner steel cylinder 11 can be written $$E_s \epsilon_{z1} = \sigma_{z1} - 2\nu_s\left(\frac{r_{1i}^2 p_i - r_{10}^2 p_{10}}{r_{10}^2 - r_{1i}^2}\right) \quad \text{(B-6)}$$

Similarly, using Hooke's Law and Equations B-3 and B-4, the axial strain of the outer steel cylinder 12 can be expressed by the equation $$E_s \epsilon_{z2} \sigma_{z2} - \frac{2\nu_s r_{2i}^2 p_{2i}}{r_{20}^2 - r_{2i}^2} \quad \text{(B-7)}$$

Since it has been assumed in the analysis that $$\epsilon_{z1} = \epsilon_{z2} = \epsilon_{zc} = H$$

the right hand sides of Equations B-6 and B-7 may be equated to give the following relationship between the axial stresses in the steel cylinders:

$$\sigma_{z1} - \sigma_{z2} = 2\nu_s\left[\frac{r_{1i}^2 p_i - r_{10}^2 p_{10}}{r_{10}^2 - r_{1i}^2} - \frac{r_{2i}^2 p_{2i}}{r_{20}^2 - r_{2i}^2}\right] \quad \text{(B-8)}$$

Axial force equilibrium of the vessel, under the assumptions stated previously, requires that $$\sigma_{z1}(r_{10}^2 - r_{1i}^2) + \sigma_{z2}(r_{20}^2 - r_{2i}^2) = p_i r_{1i}^2 \quad \text{(B-9)}$$

Using this equation and Equation B-8, the axial stresses $\sigma_{z1}$ and $\sigma_{z2}$ can be expressed in terms of $p_i$, $p_{10}$ and $p_{2i}$ as follows:

$$\sigma_{z1} = \frac{p_i r_{1i}^2 - 2\nu_s\left[r_{2i}^2 p_{2i} + (r_{10}^2 p_{10} - r_{1i}^2 p_i)\left(\frac{r_{20}^2 - r_{2i}^2}{r_{10}^2 - r_{1i}^2}\right)\right]}{r_{20}^2 - r_{2i}^2 + r_{10}^2 - r_{1i}^2}$$

(B-10)

$$\sigma_{z2} = \frac{p_i r_{1i}^2 - 2\nu_s\left[r_{1i}^2 p_i - r_{10}^2 p_{10} - \left(\frac{r_{10}^2 - r_{1i}^2}{r_{20}^2 - r_{2i}^2}\right)r_{2i}^2 p_{2i}\right]}{r_{20}^2 - r_{2i}^2 + r_{10}^2 - r_{1i}^2}$$

(B-11)

Now, by combining either Equations B-6 and B-10, or B-7 and B-11, the strain H can be expressed in terms of the dimensions of the vessel and the pressures $p_i$, $p_{10}$ and $p_{2i}$. A combination of Equations B-6 and B-10 yields the expression $$E_s H = \frac{p_i r_{1i}^2 - 2\nu_s(r_{2i}^2 p_{2i} + r_{1i}^2 p_i - r_{10}^2 p_{10})}{r_{20}^2 - r_{2i}^2 + r_{10}^2 - r_{1i}^2}$$

(B-12)

Since the steel cylinders 11 and 12 act elastically, the radial displacement U may be determined from the tangential strain-radial displacement relationship. The tangential strain $\epsilon_t$ can be expressed in terms of the stresses by the use of Hooke's Law in combination with the strain displacement equation. The result for the inner steel cylinder 11 may be written as $$\frac{U_1}{r} = \epsilon_{t1} = \frac{\sigma_{t1}}{E_s} - \frac{\nu_s}{E_s}(\sigma_{r1} + \sigma_{z1}) \quad \text{(B-13)}$$

Using the values of $\sigma_{t1}$ and $\sigma_{r1}$, from Equations B-1 and B-2, respectively, Equation B-13 gives the following expression for the radial displacement of the outer surface of the inner cylinder 11:

$$E_s \frac{U_{10}}{r_{10}}\bigg]_s = \frac{2r_{1i}^2 p_i - (r_{1i}^2 + r_{10}^2)p_{10}}{r_{10}^2 - r_{1i}^2} - \nu_s(-p_{10} + \sigma_{z1})$$

(B-14)

In the same way, Equations B-3, B-4 and an equation similar to B-13 can be combined to provide the following expression for the radial displacement for the inner surface of the outer steel cylinder 12:

$$E_s \frac{U_{2i}}{r_{2i}}\bigg]_s = \frac{(r_{2i}^2 + r_{20}^2)p_{2i}}{r_{20}^2 - r_{2i}^2} - \nu_s(-p_{2i} + \sigma_{z2})$$

(B-15)

Turning now to the cylinder of fill metal 19, it will be realized that if this cylinder acts elastically its tangential and radial stresses can also be computed from the Lamé equations at the inner and outer surfaces of the fill cylinder. These stresses can be expressed by the equations $$\sigma_{tc}]_{r=r_{10}} = \frac{r_{10}^2 p_{10} - r_{2i}^2 p_{2i}}{r_{2i}^2 - r_{10}^2} + \frac{(p_{10} - p_{2i})r_{2i}^2}{r_{2i}^2 - r_{10}^2}$$

(B-16)

$$\sigma_{tc}]_{r=r_{2i}} = \frac{r_{10}^2 p_{10} - r_{2i}^2 p_{2i}}{r_{2i}^2 - r_{10}^2} + \frac{(p_{10} - p_{2i})r_{10}^2}{r_{2i}^2 - r_{10}^2}$$

(B-17)

$$\sigma_{rc}]_{r=r_{10}} = -p_{10} \quad \text{(B-18)}$$

$$\sigma_{rc}]_{r=r_{2i}} = -p_{2i} \quad \text{(B-19)}$$

From Hooke's Law, the relationship between the axial strain and the stresses for the cylinder of fill metal 19 can be written as $$E_c \epsilon_{zc} = \sigma_{zc} - \nu_c(\sigma_{tc} + \sigma_{rc}) \quad \text{(B-20)}$$

Since the sum of the radial and tangential stresses is not a function of radius, Equations B-16 and B-18 may be combined with Equation B-20 and the result written as $$E_c \epsilon_{zc} = \sigma_{zc} - 2\nu_c\left(\frac{r_{10}^2 p_{10} - r_{2i}^2 p_{2i}}{r_{2i}^2 - r_{10}^2}\right) \quad \text{(B-21)}$$

Since $\epsilon_{zc} = H$, Equations B-12 and B-21 can be equated to afford the following expression for $\sigma_{zc}$ in terms of $p_i$, $p_{10}$ and $p_{2i}$:

$$\sigma_{zc} = 2\nu_c \left( \frac{r_{10}^2 p_{10} - r_{2i}^2 p_{2i}}{r_{2i}^2 - r_{10}^2} \right) +$$
$$\frac{E_c}{E_s} \left[ \frac{p_i r_{1i}^2 - 2\nu_s(r_{2i}p_{2i} + r_{1i}^2 p_i - r_{10}^2 p_{10})}{r_{20}^2 - r_{2i}^2 + r_{10}^2 - r_{1i}^2} \right]$$

(B-22)

As in the case of the steel cylinders 11 and 12, the radial displacement of the metal fill cylinder may be determined from the strain displacement equation and Hooke's Law and written as $$E_c \epsilon_{tc} = E_c \frac{U_c}{r} = \sigma_{tc} - \nu_c(\sigma_{rc} + \sigma_{zc}) \quad \text{(B-23)}$$

Using Equation B-23 and the stress Equations B-16 and B-18, the radial displacement of the inner surface of the metal fill cylinder may be expressed in terms of $p_{10}$, $p_{2i}$ and $\sigma_{zc}$ and written as $$E_c \left[ \frac{U_{10}}{r_{10}} \right]_0 = \frac{r_{10}^2 p_{10} - r_{2i}^2 p_{2i}}{r_{2i}^2 - r_{10}^2} + \frac{(p_{10} - p_{2i})r_{2i}^2}{r_{2i}^2 - r_{10}^2} - \nu_c(-p_{10} + \sigma_{zc})$$

(B-24)

A combination of Equations B-17, B-19 and B-23 gives the following similar expression for the radial displacement of the outer surface of the metal fill cylinder:

$$E_c \left[ \frac{U_{2i}}{r_{2i}} \right]_0 = \frac{r_{10}^2 p_{10} - r_{2i}^2 p_{2i}}{r_{2i}^2 - r_{10}^2} + \frac{(p_{10} - p_{2i})r_{10}^2}{r_{2i}^2 - r_{10}^2} - \nu_c(-p_{2i} + \sigma_{zc})$$

(B-25)

The radial displacement of the steel cylinder 11 and 12 and the metal fill cylinder at each interface must be the same. Therefore, the displacement given by Equation B-24 can be equated with the displacement given by Equation B-14 to provide the expression $$\frac{r_{1i}^2 p_i - r_{10}^2 p_{10}}{r_{10}^2 - r_{1i}^2} + \frac{(p_i - p_{10})r_{1i}^2}{r_{10}^2 - r_{1i}^2} - \nu_s(-p_{10} + \sigma_{z1}) =$$
$$\frac{E_s}{E_c} \left[ \frac{r_{10}^2 p_{10} - r_{2i}^2 p_{2i}}{r_{2i}^2 - r_{10}^2} + \frac{(p_{10} - p_{2i})r_{2i}^2}{r_{2i}^2 - r_{10}^2} - \nu_c(p_{2i} + \sigma_{zc}) \right]$$

(B-26)

Similarly, Equations B-25 and B-15 can be combined to give the relationship $$\frac{r_{2i}^2 p_{2i}}{r_{20}^2 - r_{2i}^2} + \frac{r_{20}^2 p_{2i}}{r_{20}^2 - r_{2i}^2} - \nu_s(-p_{2i} + \sigma_{z2}) =$$
$$\frac{E_s}{E_c} \left[ \frac{r_{10}^2 p_{10} - r_{2i}^2 p_{2i}}{r_{2i}^2 - r_{10}^2} + \frac{(p_{10} - p_{2i})r_{10}^2}{r_{2i}^2 - r_{10}^2} - \nu_c(-p_{10} - \sigma_{zc}) \right]$$

(B-27)

Since the axial stresses $\sigma_{z1}$ and $\sigma_{z2}$ and $\sigma_{zc}$ used in Equations B-26 and B-27 can be expressed in terms of $p_{2i}$, $p_{10}$ and $p_i$ by means of Equations B-10, B-11 and B-22, respectively, the final Equations B-26 and B-27 can be used to determine the unknowns $p_{10}$ and $p_{2i}$ in terms of $p_i$.

The results of the foregoing analysis are valid until the fill metal 19 becomes plastic. This will generally occur first at the inner radius of the fill cylinder. The internal pressure $p_i$ at which this happens can be determined by comparing the stress intensity $\sigma_{tc} - \sigma_{rc}$ at $r = r_{10}$, with the yield stress $Y_c$ of the fill metal. From Equations B-16 and B-18, the mathematical expression for this relationship is $$\frac{2(p_{10} - p_{2i})r_{2i}^2}{r_{2i}^2 - r_{10}^2} = Y_c \quad \text{(B-28)}$$

Since Equations B-10, B-11, B-22, B-26 and B-27 can, as explained above, provide a relationship between the pressures $p_{10}$ and $p_{2i}$ and the internal pressure $p_i$, Equation B-28 will furnish the internal pressure $p_i$ at which the fill metal will commence to yield. If this value of $p_i$ is less than the desired operating pressure of the vessel, then the preceding elastic analysis of the fill material is valid.

The preceding analysis was based on the assumption that the axial strains in the steel cylinders 11 and 12 and in the metal fill cylinder 19 are equal. Therefore, it is necessary to determine whether or not this assumption is valid under the required operating conditions of the vessel. This may be done by comparing the frictional force F developed between the steel and metal fill layers with the total axial force F' acting on the fill metal. The maximum frictional force is equal to $2\mu\pi(r_{10}p_{10} + r_{2i}p_{2i})L$, where $\mu$ is the coefficient of friction, and L is the length of the cylinder. The axial force F', on the other hand, is equal to $\sigma_{zc} \times \pi(r_{2i}^2 - r_{10}^2)$. Thus, in order for the foregoing analysis to be valid, the following relationship must be satisfied:

$$\sigma_{zc} \leq \frac{2\mu(r_{10}p_{10} + r_{2i}p_{2i})L}{r_{2i}^2 - r_{10}^2} \quad \text{(B-29)}$$

In the case where the fill metal 19 acts elastically, the frictional requirement can be checked by means of Equations B-22 and B-29.

B.2 Fill metal acts plastically

The radial displacement in an elastic-plastic cylinder subjected to internal and external pressures can be derived, in terms of the external pressure, the elastic-plastic boundary $r = \rho$, the yield strength of the material, and the axial strain by using the Tresca criterion of yielding and the assumption that the axial stress is the intermediate stress, i.e., that $\sigma_r < \sigma_z < \sigma_t$. If the equations are considered for an elastic, perfectly plastic material, the expression for the radial displacement of the fill metal in the elastic region is written as $$\frac{E_c}{Y_c} \frac{U_c}{r} = \frac{(1 + \nu_c)}{2} \frac{\rho^2}{r^2} +$$
$$(1 - 2\nu_c)(1 + \nu_c)\left( \frac{1}{2} \frac{\rho^2}{r_{2i}^2} - \frac{p_{2i}}{Y_c} \right) - \frac{\nu_c E_c \epsilon_{zc}}{Y_c}$$

(B-30)

where $\rho \leq r \leq r_{2i}$. Similarly, radial displacement in the plastic region can be written as $$\frac{E_c}{Y_c} \frac{U_c}{r} = (1 - \nu_c^2) \frac{\rho^2}{r^2} +$$
$$(1 - 2\nu_c)(1 + \nu_c)\left[ -\frac{1}{2}\left(1 - \frac{\rho^2}{r_{2i}^2}\right) - \frac{p_{2i}}{Y_c} - \ln \frac{\rho}{r} \right] - \frac{\nu_c E_c \epsilon_{zc}}{Y_c}$$

(B-30')

where $r_{10} \leq r \leq \rho$. Although the solution could be determined by the use of Equation B-30 and the displacements of the steel cylinders, the resulting equation would be lengthy. A simpler solution is found by assuming that the internal pressure at which the inner surface of the metal fill cylinder becomes plastic is not too different from the pressure at which the entire metal fill cylinder becomes plastic. This assumption is not unrealistic when it is recalled that the thickness of the metal fill cylinder is small. Therefore, in lieu of making the involved calculations, the value of $p_i$ for full plasticity will first be computed. Then the values of $p_{2i}$ and $p_{10}$ will be determined in terms of $p_i$ for the case of full plasticity. It may then be conservatively assumed that this relationship is valid throughout the yielding range of the metal fill cylinder.

For full plasticity of the fill metal, $\rho$ may be set equal to $r_{2i}$ in Equation B-30'. The radial displacement of the inner surface of the fill cylinder 19, in terms of the various pressures, may then be determined from Equations B-12 and B-30', keeping in mind that $\epsilon_{zc}=H$. The resulting expression is written as $$\frac{E_c}{Y_c}\frac{U_{10}}{r_{10}}\Big]_c = (1-\nu_c^2)\frac{r_{2i}^2}{r_{10}^2}+(1-2\nu_c)(1+\nu_c)\left(-\frac{p_{10}}{Y_c}\right)-$$
$$\frac{\nu_c}{Y_c}\frac{E_c}{E_s}\left[\frac{p_i r_{1i}^2 - 2\nu_s(r_{2i}^2 p_{2i}+r_{1i}^2 p_i - r_{10}^2 p_{10})}{r_{20}^2-r_{2i}^2+r_{10}^2-r_{1i}^2}\right] \quad \text{(B-31)}$$

Similarly, the radial displacement of the outer surface of the fully plastic fill metal cylinder can be represented by the equation $$\frac{E_c}{Y_c}\frac{U_{2i}}{r_{2i}}\Big]_c = \frac{1+\nu_c}{2}+(1-2\nu_c)(1+\nu_c)\left(\frac{1}{2}-\frac{p_{2i}}{Y_c}\right)-$$
$$\frac{\nu_c}{Y_c}\frac{E_c}{E_s}\left[\frac{p_i r_{1i}^2 - 2\nu_s(r_{2i}^2 p_{2i}+r_{1i}^2 p_i - r_{10}^2 p_{10})}{r_{20}^2-r_{2i}^2+r_{10}^2-r_{1i}^2}\right] \quad \text{(B-32)}$$

If the steel cylinders 11 and 12 still act in an elastic manner, their radial displacements can be expressed by Equations B-14 and B-15, respectively. These equations may be written in terms of $p_{10}$, $p_{2i}$ and $p_i$ by using the expressions of Equations B-10 and B-11 for the axial stresses. Since the radial displacement at each interface must be the same for the steel cylinder as for the fill metal cylinder, Equations B-10, B-14 and B-31 can be combined to provide one relationship between $p_{10}$, $p_{2i}$ and $p_i$, and Equations B-11, B-15 and B-32 can be combined to provide another such relationship. The resulting equations may be written as follows:

$$\frac{r_{1i}^2 p_i - r_{10}^2 p_{10}}{r_{10}^2 - r_{1i}^2} - \frac{(p_i-p_{10})r_{1i}^2}{r_{10}^2-r_{1i}^2} - \nu_s(-p_{10}+\sigma_{z1})=$$
$$\frac{E_s}{E_c}Y_c\left[\frac{(1-\nu_c^2)}{2}\frac{r_{2i}^2}{r_{10}^2}+(1-2\nu_c)(1+\nu_c)\left(\frac{p_{10}}{Y_c}\right)-\right.$$
$$\left.\frac{\nu_c}{Y_c}\frac{E_c}{E_s}\left(\sigma_{z1}-2\nu_s\left(\frac{r_{1i}^2 p_i - r_{10}^2 p_{10}}{r_{10}^2-r_{1i}^2}\right)\right)\right] \quad \text{(B-33)}$$

$$\frac{(r_{2i}^2+r_{20}^2)p_{z2i}}{r_{20}^2-r_{2i}^2}-\nu_s(\sigma_{z2}-p_{zi})=$$
$$\frac{E_s}{E_c}Y_c\left[\frac{1+\nu_c}{2}+(1-2\nu_c)(1+\nu_c)\left(\frac{1}{2}-\frac{p_{2i}}{Y_c}\right)-\right.$$
$$\left.\frac{\nu_c}{Y_c}\frac{E_c}{E_s}\left(\sigma_{z1}-2\nu_s\left(\frac{r_{1i}^2 p_i - r_{10}^2 p_{10}}{r_{10}^2-r_{1i}^2}\right)\right)\right] \quad \text{(B-34)}$$

The radial force equilibrium expression for the metal fill cylinder 19 is $$\sigma_{tc}-\sigma_{rc}=r\frac{d\sigma_{rc}}{dr} \quad \text{(B-35)}$$

By the use of the Tresca flow criterion, $\sigma_{tc}-\sigma_{rc}=Y_c$, Equation B-35 becomes $$Y_c=r\frac{d\sigma_r}{dr} \quad \text{(B-36)}$$

When Equation B-36 is integrated, using the boundary values of $\sigma_{rc}=-p_{2i}$ at $r=r_{2i}$, and $\sigma_{rc}=-p_{10}$ at $r=r_{10}$, the result may be written $$p_{10}-p_{2i}=Y_c \ln \frac{r_{2i}}{r_{10}} \quad \text{(B-37)}$$

From Equations B-33, B-34 and B-37, we can determine the minimum internal pressure $p_i$ at which the fill metal cylinder becomes fully plastic.

If Equation B-36 is integrated using the limits of $\sigma_{rc}=-p_{10}$ at $r=r_{10}$, and $\sigma_r=\sigma_{rc}$ at $r=r$, the radial stress for full plasticity may be written as $$\frac{\sigma_{rc}}{Y_c}=-\frac{p_{10}}{Y_c}-\ln \frac{r_{10}}{r} \quad \text{(B-38)}$$

By the use of Tresca's flow criterion, $\sigma_{tc}=\sigma_{rc}+Y_c$, the tangential stress for full plasticity can be expressed by the equation $$\frac{\sigma_{tc}}{Y_c}=1-\frac{p_{10}}{Y_c}-\ln \frac{r_{10}}{r} \quad \text{(B-39)}$$

The axial stress in the fully plastic metal fill cylinder 19 may be determined from Hooke's Law, as given in Equation B-20, in terms of the other two stresses and the axial strain, since the plastic strain in the axial direction is zero. Since this axial strain is H, and H may be expressed in terms of the pressures $p_{10}$, $p_{2i}$ and $p_i$, (see Equation B-12), the axial stress in the metal fill cylinder may be written as $$\frac{\sigma_{zc}}{Y_c}=\nu_c-2\nu_c\frac{p_{10}}{Y_c}-2\nu_c \ln\left(\frac{r_{10}}{r}\right)+$$
$$\frac{E_c}{Y_c}\left[\frac{p_i r_{1i}^2 - 2\nu_s(r_{2i}^2 p_{2i}+r_{1i}^2 p_i - r_{10}^2 p_{10})}{r_{20}^2-r_{2i}^2+r_{10}^2-r_{1i}^2}\right] \quad \text{(B-40)}$$

The displacements of the metal fill cylinder 19 at the onset of full plasticity can be determined by means of Equations B-24 and B-25. Displacements beyond those values may be obtained from considerations of the dilatation. Since the total plastic strain is zero, the dilatation is purely elastic. By use of the three Hooke's Law relationships, and the radial and tangential strain displacement equations, the result may be written $$\frac{dU_c}{dr}+\frac{U_c}{r}+\epsilon_{zc}=\frac{1-2\nu_c}{E_c}(\sigma_{rc}+\sigma_{tc}+\sigma_{zc}) \quad \text{(B-41)}$$

Since $\sigma_t \geq \sigma_Z \geq \sigma_r$, the axial strain $\epsilon_Z$ is purely elastic and constant with respect to radius. Substitution of the values for $\sigma_r$, $\sigma_t$, and $\sigma_Z$ obtained from Equations B-38, B-39 and B-40 leads to the differential equation $$\frac{dU_c}{dr}+\frac{U_c}{r}=-2(1-2\nu_c)(1+\nu_c)\frac{p_{10}}{E_c}-$$
$$2(1-2\nu_c)(1+\nu_c)\frac{Y_c}{E_c}\ln\frac{r_{10}}{r}+(1-2\nu_c)(1+\nu_c)\frac{Y_c}{E_c}-2\nu_c H \quad \text{(B-42)}$$

wherein H is given by Equation B-12 in terms of $p_i$, $p_{10}$ and $p_{2i}$. If each term of Equation B-42 is multiplied by $rdr$, and the resulting expression integrated, Equation B-42 becomes $$E_c \frac{U_c}{r} = -(1-2\nu_c)(1+\nu_c)p_{10}-$$
$$(1-2\nu_c)(1+\nu_c)Y_c \ln \frac{r_{10}}{r}-\nu_c E_c H+\frac{C_5}{r^2} \quad \text{(B-43)}$$

where $C_5$ is a constant of integration.

At $r=r_{10}$, the radial displacement of the fill metal cylinder is $$E_c \frac{U_{10}}{r_{10}}\Big]_c = -(1-2\nu_c)(1+\nu_c)p_{10}-\nu_c E_c H+\frac{C_5}{r_{10}^2} \quad \text{(B-44)}$$

By using Equation B-37 and a similar analysis, the radial displacement of the fill metal at $r_{2i}$ can be expressed by the equation $$E_c \frac{U_{2i}}{r_{2i}}\Big]_c = -(1-2\nu_c)(1+\nu_c)p_{2i}-\nu_c E_c H+\frac{C_5}{r_{2i}^2} \quad \text{(B-45)}$$

The radial displacement at each interface must be the same for both the steel layer and the metal fill layer. In other words, at $r=r_{10}$ $$\frac{U_{10}}{r_{10}}\Big]_s = \frac{U_{10}}{r_{10}}\Big]_c \quad \text{(B-46)}$$

Equations B-10, B-12, B-14 and B-44 can be combined with Equations B-46 in order to produce an expression for $C_5$, $p_{10}$ and $p_{2i}$ in terms of $p_i$. A second expression for $C_5$, $p_{10}$ and $p_{2i}$ in terms of $p_i$ can be obtained by considering the radial displacements at the second interface. This involves use of Equations B-11, B-12, B-15, B-45 and equation $$\left.\frac{U_{2i}}{r_{2i}}\right]_s = \left.\frac{U_{2i}}{r_{2i}}\right]_c \qquad (B-47)$$

Since Equation B-37 provides a relationship between $p_{10}$ and $p_{2i}$, this equation together with Equations B-46 and B-47 provides the means for obtaining explicit values for $p_{2i}$, $p_{10}$ and $C_5$ in terms of $p_i$.

The results of this analysis are valid as long as there is no slippage between the metal fill layer and the steel layers, and as long as the axial stress $\sigma_z$ does not exceed the tangential stress $\sigma_t$ at any point in the thickness of the fill metal. The slippage limitation may be checked by using the values $p_i$, $p_{10}$ and Equations B-29 and B-40. The axial stress limitation, on the other hand, requires determination of the minimum internal pressure $p_i$ at which the axial stress becomes equal to the circumferential stress at some point in the cross section of the metal fill cylinder. The radius at which the inequality $\sigma_z > \sigma_t$ is first violated is $r = r_{10}$. This will be seen from Equations B-39 and B-40 if a particular value of $p_i$, and therefore $p_{10}$ and $p_{2i}$, is chosen such that $\sigma_z = \sigma_t$ at $r = r_{10}$. At that value of $p_i$, it will be seen that at the radius $r_{2i}$, $\sigma_{tc} > \sigma_{zc}$.

At $r = r_{10}$, Equation B-40 can be written $$\left.\frac{\sigma_{zc}}{Y_c}\right]_{r=r_{10}} = \nu_c - 2\nu_c \frac{p_{10}}{Y_c} + \frac{E_c}{Y_c} H \qquad (B-48)$$

where H is given by Equation B-12. From Equation B-39, the tangential stress $\sigma_{tc}$ at $r = r_{10}$ can be written $$\left.\frac{\sigma_{tc}}{Y_c}\right]_{r=r_{10}} = 1 - \frac{p_{10}}{Y_c} \qquad (B-49)$$

If the stresses given by Equations B-48 and B-49 are equated, the axial stress limitation can be expressed as $$(1 - 2\nu_c)\frac{p_{10}}{Y_c} + \frac{E_c}{Y_c} H \leq (1 - \nu_c) \qquad (B-50)$$

By the use of Equations B-37, B-46, B-47 and B-50, explicit values of $p_i$, $p_{10}$, $p_{21}$ and $C_5$ may be determined.

B.3 Fill metal acts as a fluid

At internal pressures higher than the pressure $p_{if}$ at which the longitudinal stress in the fill metal becomes equal to the tangential stress in this layer, it is considered that the fill metal acts as a fluid. The validity of the assumption can be proved by considering first, that the radial equilibrium expression of the Equation B-38 applies even though the fill metal is acting as a fluid, and second, that since the analysis is based on the Tresca Yield Criterion and an appropriate flow law, the conditions under which $\sigma_{tc} = \sigma_{tc}$ imply that the flow law may be written as $$\sigma_{tc} - \sigma_{rc} = Y_c \qquad (B-51)$$

$$\sigma_{zc} - \sigma_{rc} = Y_c \qquad (B-52)$$

Since Equation B-38 shows that any increment in the pressure $p_{10}$ is immediately reflected as an equal increment in the stress $\sigma_{rc}$, and this increment is the same at any radius $r$, and Equations B-51 and B-52 show that incremental changes in $\sigma_{rc}$ produce identical incremental changes in the other two stresses, it is evident that the added pressure $p_{II}$, i.e., the pressure in the fill metal above that produced by the internal pressure $p_{if}$, is reflected as a hydrostatic pressure throughout the fill metal.

Although the internal pressure at which the axial stress becomes equal to the circumferential stress depends upon the radius of the point at which the stresses are computed, the range of internal pressures required to produce this relationship throughout the entire cross section of the metal fill cylinder is very small because the thickness of this cylinder is small. Therefore in order to simplify the calculations, it will be assumed that the entire metal fill cylinder acts as a fluid as soon as the tangential and axial stresses at the inner radius $r_{10}$ becomes equal. This is a conservative approach because it underestimates the internal pressure required to produce full fluid behavior of the metal fill layer.

Since the added stresses attributable to internal pressures above $p_{if}$ are all equal, the bulk modulus of the fill metal may be computed from the incremental volume change per unit volume $\Delta V$. This volume change is purely elastic, and therefore it may be determined from the sum of the elastic strains and Hooke's Law. Mathematically it can be expressed as $$\Delta V = \epsilon_{tc} + \epsilon_{rc} + \epsilon_{zc} = -\frac{3(1-2\nu_c)}{E_c} p_{II} \qquad (B-53)$$

where $p_{II}$ is the change in pressure in the fill metal attributable to the increase in internal pressure above $p_{if}$. The term $$\frac{E_c}{3(1-2\nu_c)}$$

may now be treated as a bulk modulus $K_c$ for these pressure increments.

The values of the radial displacements of the elastic steel cylinder 11 and 12 for pressures up to $p_{if}$ are given by Equations B-14 and B-15. The additional displacements attributable to the incremental pressures $p_I$ and $p_{II}$ can be expressed by the equations $$\frac{\Delta U_{10}}{r_{10}} = \frac{1}{E_s}\left[\frac{r_{1i}^2 p_I - r_{10}^2 p_{II}}{r_{10}^2 - r_{1i}^2} + \frac{(p_I - p_{II})r_{1i}^2}{r_{10}^2 - r_{1i}^2} - \nu_s(-p_{II} + \Delta\sigma_{z1})\right]$$

(B-54)

$$\frac{\Delta U_{2i}}{r_{2i}} = \frac{1}{E_s}\left[\frac{(r_{2i}^2 + r_{20}^2)p_{II}}{r_{20}^2 - r_{2i}^2} - \nu_s(-p_{II} + \Delta\sigma_{z2})\right]$$

(B-55)

where $\Delta U_{10}$ and $\Delta U_{2i}$ are incremental displacements due only to $p_I$ and $p_{II}$ and are not the absolute displacements. The values of $\Delta\sigma_{z1}$ and $\Delta\sigma_{z2}$ can be determined from Equations B-10 and B-11 by substituting $p_I$ for $p_i$, and $p_{II}$ for both $p_{10}$ and $p_{2i}$. The revised versions of Equations B-10 and B-11 are written as $$\Delta\sigma_{z1} = \frac{p_I r_{1i}^2 - 2\nu_s\left[r_{2i}^2 p_{II} + (r_{10}^2 p_{II} - r_{1i}^2 p_I)\left(\frac{r_{20}^2 - r_{2i}^2}{r_{10}^2 - r_{1i}^2}\right)\right]}{r_{20}^2 - r_{2i}^2 + r_{10}^2 - r_{1i}^2}$$

(B-56)

$$\Delta\sigma_{z2} = \frac{p_I r_{1i}^2 - 2\nu_s\left[r_{1i}^2 p_I - r_{10}^2 p_{II} - \left(\frac{r_{10}^2 - r_{1i}^2}{r_{20}^2 - r_{2i}^2}\right)r_{2i}^2 p_{II}\right]}{r_{20}^2 - r_{2i}^2 + r_{10}^2 - r_{1i}^2}$$

(B-57)

where $\Delta\sigma_{z1}$ and $\Delta\sigma_{z2}$ are the changes in the axial stresses due to the pressure increments.

The change in volume per unit volume of the annular space 18 between the steel cylinders 11 and 12 for a particular pressure increment can be equated to the bulk modulus of the fill material multiplied by that pressure increment. This relationship can be expressed by the equation $$\frac{p_{II}}{K_c} = 1 - \left[\frac{(r_{2i} + \Delta U_{2i})^2 - (r_{10} + \Delta U_{10})^2}{r_{2i}^2 - r_{10}^2}\right](1 + \Delta\epsilon_z)$$

(B-58)

where $\Delta\epsilon_z$ is the increment in the axial strain of the steel cylinders attributable to $p_{II}$. This incremental strain can be determined from Equation B–12 by rewriting this equation in the following form $$E_s \Delta \epsilon_z = \frac{p_I r_{1i}^2 - 2\nu_s(r_{2i}^2 p_{II} + r_{1i}^2 p_I - r_{10}^2 p_{II})}{r_{20}^2 - r_{2i}^2 + r_{10}^2 - r_{1i}^2} \quad (B-59)$$

By neglecting squares and products of high order terms, Equation B–58 can be simplified and written as $$\frac{p_{II}}{K_c} = -\left[\Delta \epsilon_z + 2\left(\frac{r_{2i}\Delta U_{2i} - r_{10}\Delta U_{10}}{r_{2i}^2 - r_{10}^2}\right)\right] \quad (B-60)$$

Simultaneous solution of Equations B–54 through B–57 and B–59 and B–60 will provide values of $p_{II}$ in terms of $p_I$.

In real vessels which use thin layers of a fill metal, such as Cerrocast, the pressure transmission results obtained from an analysis based on the assumption that the fill metal always acts as a fluid can be quite close to the results obtained from the more exact analyses of Sections B.1 and B.2. The illustrated embodiment of the cylindrical part of FIG. 1 is a good case in point. For the nomenclature given in FIGURE 4, let the numerical values be chosen as $$r_{1i} = 30''$$
$$r_{1o} = 36''$$
$$r_{2i} = 36.125''$$
$$r_{2o} = 42.125''$$

At values of internal pressure $P_i$ below 8420 p.s.i., the fill metal 19 acts elastically, and the analysis of Section B.1 yields a ratio of $p_{10}$ to $p_i$ of 0.37501. At internal pressures between 8460 and 21,000 p.s.i., the fill metal is fully plastic (i.e., $\sigma_t - \sigma_r = Y$, assuming that $\sigma_z < \sigma_t$), and the analysis of Section B.2 gives a value of 0.37433 for the ratio $p_{10}/p_i$. At higher internal pressures the fill metal acts as a fluid, and in this region the present Section B.3 predicts a ratio of $p_{II}/p_I$ equal to 0.37344. In this last mentioned case, the pressure transmission ratio becomes 0.37415 in the theoretical case where the fill metal is infinitely rigid, i.e., the bulb modulus of the fill metal is infinite. Since the results of these analyses are not greatly different, it is apparent that in cases where the fill layer is thin and the fill metal has a rather high compressibility, the equations of this section can be used over the whole range of operating pressure, and not just for incremental pressures above that pressure necessary to make the fill metal act as a fluid. In other words, the pressures $p_I$ and $p_{II}$ can be replaced by the absolute pressures $p_1$ and $p_2$. While this is a conservative approach, the margin of safety is not unreasonable, and in cases where a computer is not available, it greatly simplifies the time required to make the stress analysis for the vessel.

Although the discussions in this appendix presume that the pressure in chamber 13 is increasing, it will be understood that the behavior of the fill metal during a reduction in internal pressure can be analyzed in the same way.

APPENDIX C.—ANALYSIS OF PRESSURE EFFECTS IN PRESTRESSED VESSEL

The analysis of Appendix B is applicable when the initial pressurization of fill layer 19 is such that the vessel acts as a thick walled cylinder. Now we will consider the specific equations for the case where this layer is subjected to an added pressure, which under vessel-operating temperature and pressure is $p_a$. The combination of operating pressure and the added pressure $p_a$ produces equal stress intensities at the inner radii of the cylinders 11 and 12. Obviously this type of vessel makes more efficient use of the metal in the walls, and can accommodate much higher operating pressures.

The added pressure $p_a$ will be called the shrink fit pressure and, from the Lamé equations, the stresses it produces can be written as follows:

$$\sigma_{t1}\bigg]_r = -\frac{p_a r_{10}^2}{r_{10}^2 - r_{1i}^2} - \frac{p_a r_{10}^2 r_{1i}^2}{r^2(r_{10}^2 - r_{1i}^2)} \quad (C-1)$$

$$\sigma_{r1}\bigg]_r = -\frac{p_a r_{10}^2}{r_{10}^2 - r_{1i}^2} + \frac{p_a r_{10}^2 r_{1i}^2}{r^2(r_{10}^2 - r_{1i}^2)} \quad (C-2)$$

$$\sigma_{t2}\bigg]_r = +\frac{p_a r_{2i}^2}{r_{20}^2 - r_{2i}^2} + \frac{p_a r_{2i}^2 r_{20}^2}{r^2(r_{20}^2 - r_{2i}^2)} \quad (C-3)$$

$$\sigma_{r2}\bigg]_r = +\frac{p_a r_{2i}^2}{r_{20}^2 - r_{2i}^2} - \frac{p_a r_{2i}^2 r_{20}^2}{r^2(r_{20}^2 - r_{2i}^2)} \quad (C-4)$$

As pointed out in Section B.3 of Appendix B, the errors introduced by the assumption that the fill metal 19 always acts as a fluid are not great in the case of a real vessel which has a thin and fairly rigid fill layer. Therefore, in the interests of simplicity, we shall use here this conservative approach. With this in mind, the Lamé stresses attributable to a design internal pressure $p_i$ and a design fill metal pressure $p_2$ can be written as $$\sigma_{t1}\bigg]_r = \frac{p_i r_{1i}^2 - p_2 r_{10}^2}{r_{10}^2 - r_{1i}^2} + \frac{(p_i - p_2) r_{10}^2 r_{1i}^2}{r^2(r_{10}^2 - r_{1i}^2)} \quad (C-5)$$

$$\sigma_{r1}\bigg]_r = \frac{p_i r_{1i}^2 - p_2 r_{10}^2}{r_{10}^2 - r_{1i}^2} - \frac{(p_i - p_2) r_{10}^2 r_{1i}^2}{r^2(r_{10}^2 - r_{1i}^2)} \quad (C-6)$$

$$\sigma_{t2}\bigg]_r = \frac{p_2 r_{2i}^2}{r_{20}^2 - r_{2i}^2} + \frac{p_2 r_{2i}^2 r_{20}^2}{r^2(r_{20}^2 - r_{2i}^2)} \quad (C-7)$$

$$\sigma_{r2}\bigg]_r = \frac{p_2 r_{2i}^2}{r_{20}^2 - r_{2i}^2} - \frac{p_2 r_{2i}^2 r_{20}^2}{r^2(r_{20}^2 - r_{2i}^2)} \quad (C-8)$$

By substituting $p_i$ and $p_2$ for $p_I$ and $p_{II}$ in Equation B–60 of Appendix B, a relationship between $p_i$ and $p_2$ can be obtained. Then, by superimposing the stresses due to the shrink fit pressure $p_a$ upon those due to the design pressure, the total stresses in the cylinders 11 and 12 can be written $$\sigma_{t1}\bigg]_r = \frac{p_i r_{1i}^2 - (p_2 + p_a) r_{10}^2}{r_{10}^2 - r_{1i}^2} + \frac{(p_i - p_2 - p_a) r_{10}^2 r_{1i}^2}{r^2(r_{10}^2 - r_{1i}^2)} \quad (C-9)$$

$$\sigma_{r1}\bigg]_r = \frac{p_i r_{1i}^2 - (p_2 + p_a) r_{10}^2}{r_{10}^2 - r_{1i}^2} - \frac{(p_i - p_2 - p_a) r_{10}^2 r_{1i}^2}{r^2(r_{10}^2 - r_{1i}^2)} \quad (C-10)$$

$$\sigma_{t2}\bigg]_r = \frac{(p_2 + p_a) r_{2i}^2}{r_{20}^2 - r_{2i}^2} + \frac{(p_2 + p_a) r_{2i}^2 r_{20}^2}{r^2(r_{20}^2 - r_{2i}^2)} \quad (C-11)$$

$$\sigma_{r2}\bigg]_r = \frac{(p_2 + p_a) r_{2i}^2}{r_{20}^2 - r_{2i}^2} - \frac{(p_2 + p_a) r_{2i}^2 r_{20}^2}{r^2(r_{20}^2 - r_{2i}^2)} \quad (C-12)$$

If it is assumed that stress intensity is used as the design criterion, and that the axial stress is the intermediate principal stress, the stated goal of producing equal stress intensities at the inner surfaces of the cylinders 11 and 12 provides the expression $$\frac{(p_i - p_2 - p_a) r_{10}^2}{r_{10}^2 - r_{1i}^2} = \frac{(p_2 + p_a) r_{20}^2}{r_{20}^2 - r_{2i}^2} \quad (C-13)$$

Since Equations B–54 through B–57 and B–59 and B–60 provide a relationship between $p_2$ and $p_i$, Equation C–13 can be used to express $p_a$ in terms of $p_i$. The maximum value of $p_i$ which is permitted by the chosen design stress intensity can be determined by comparing the maximum stress intensity at the inner surface of one of the cylinders (and it may be either one since the goal is to produce the same stress intensity at each inner surface) with this chosen design value. Using the stress intensity at the inner surface of the inner layer 11, the result may be written $$p_i - p_2 - p_a = \frac{S_d(r_{10}^2 - r_{1i}^2)}{r_{10}^2} \quad (C-14)$$

where $S_d$ is the chosen design stress intensity.

Once $p_i$ and $p_a$ are determined in the manner just outlined, the filling pressure required at the melting temperature of the metal 19 can be obtained by adding to pressure $p_a$ the pressure $p_{mf}$ which takes into account the volume change due to the change of state of the fill metal and also the differential thermal expansion of the steel walls 11 and 12 and the fill metal 19. The value of the pressure $p_{mf}$ is obtained from the Equation A–17 of Appendix A.

The pressure $p_a$ acts in the fill metal 19 at the normal operating temperature of the vessel. In cases where the operating temperature is changed, the pressure $p_a$ should be increased or decreased from the mean value an amount $p_b$ which is determined from Equation A–13 in Appendix A. The stress change caused by pressure $p_b$ may be obtained from equations identical to C–1 through C–4 by substituting $p_b$ for $p_a$. If it is desired to maintain the chosen value of design stress intensity $S_d$, then $p_a$ must be changed in the analysis by the amount $p_b$.

In the case of the prestressed vessel being treated in this appendix, the exact analysis of the behavior of the fill metal 19 on a reduction of the pressure in chamber 13 is not the same as the analysis used for an increasing internal pressure, if the applied pressure caused plastic flow of the fill metal. Initially, the pressure in the fill layer is hydrostatic in nature, but, when the internal pressure in chamber 13 has been raised to a level which renders the entire fill layer plastic, the pressure acting on the inner surface of layer 19 will be higher than the pressure acting on the outer surface. As the internal pressure is subsequently reduced, the stresses in the fill metal are initially elastic, and this pressure differential across the fill layer reduces. At some lower level of internal pressure, the fill layer will again become plastic, and the pressure differential acting across it will increase in the opposite sense. Therefore, when chamber 13 is finally vented to the atmosphere, fill layer 19 will be subjected to an inwardly directed pressure differential rather than to the hydrostatic loading which existed originally. The vessel can be compensated for this pressure differential by merely lowering slightly its allowable internal pressure. However, in many cases, this differential is small, for example on the order of 20 p.s.i. in the case of the specific vessel mentioned earlier, and can be ignored. Thus, the assumption that the fill metal acts as a fluid frequently can be used for the analysis of the effects of a reduction in internal pressure.

Vessels having more than one fill layer 19 can be analyzed in a manner similar to that set forth above, but, of course, the number of equations presented for simultaneous solution will be greater. In addition, if the assumption that the fill layer acts as a fluid gives unrealistic results, it will also be necessary to use the more exact solutions set forth in Appendix B as well as similar exact expressions for pressure reductions.

What we claim is:

1. A high pressure vessel comprising
    (a) a plurality of spaced, superposed metal layers enclosing a pressure chamber;
    (b) a closed, pressure-tight space between each adjacent pair of layers; and
    (c) a mass of metal completely filling each pressure-tight space and serving to transmit to the adjacent outer layer the pressure loading acting on the adjacent inner layer.

2. A pressure vessel as defined in claim 1 wherein the metal layers are generally coaxial cylinders and which includes end closure means for closing the opposite ends of the cylinders.

3. A pressure vessel as defined in claim 2 wherein at least one end closure means comprises
    (a) a plurality of superposed curved metal layers;
    (b) a closed, pressure-tight space between each adjacent pair of curved layers; and
    (c) a mass of metal completely filling each space between the curved layers and serving to transmit to the adjacent outer layer the pressure loading acting on the adjacent inner layer.

4. A pressure vessel as defined in claim 2 wherein at least one end closure means comprises
    (a) a plurality of superposed curved metal layers, each curved layer being welded to and closing the end of one cylinder;
    (b) a space between each adjacent pair of curved layers communicating with the corresponding space between the connected cylinders; and
    (c) a mass of metal completely filling each space between the curved layers and serving to transmit to the adjacent outer layer the pressure loading acting on the adjacent inner layer, the fill metal in each space being the same as the fill metal in the communicating space between the cylinders.

5. A pressure vessel as defined in claim 1 wherein said mass of metal is unpressurized when the pressure chamber is vented, whereby pressurization of the vessel produces substantially Lamé stresses in the metal layers.

6. A pressure vessel as defined in claim 1 wherein said mass of metal is pressurized when the pressure chamber is vented so that a residual stress pattern is produced in the metal layers.

7. A pressure vessel as defined in claim 1 wherein the metal layers are made from a high strength, low alloy steel, and the fill metal is lead or a bismuth alloy having a low melting temperature.

8. A pressure vessel as defined in claim 1 wherein the metal layers are made of steel selected from the group comprising T–1, A–387D, HY–100; and the fill metal is a bismuth-tin alloy having a nominal composition of 40% bismuth and 60% tin.

9. An end closure for a pressure vessel comprising
    (a) a plurality of superposed metal walls which are curved in a plurality of directions;
    (b) a closed pressure-tight space between each adjacent pair of walls; and
    (c) a mass of metal completely filling each pressure-tight space and serving to transmit to the adjacent outer wall the pressure loading acting on the adjacent inner wall.

10. An end closure as defined in claim 9 wherein said mass of metal is unpressurized.

11. An end closure as defined in claim 9 wherein said mass of metal is pressurized so that a residual stress pattern is produced in the metal walls.

12. A method of fabricating a pressure vessel which comprises the steps of
    (a) forming a first metal wall to enclose a pressure chamber;
    (b) enclosing the first wall with a second metal wall which is spaced from the first wall to define an intervening pressure-tight space;
    (c) completely filling the space with a pressurized mass of molten metal whose melting temperature is materially less than that of the metal from which the walls are made; and
    (d) sealing off the space so as to trap therein the metal with which it was filled.

13. The method defined in claim 12 wherein the mass of metal is subjected to a predetermined pressure until after it freezes, said pressure being selected to take into account the change in volume of the fill metal as it freezes and the thermal coefficients of expansion of the solid fill metal and the metals of which the adjacent walls are made.

14. The method defined in claim 12 wherein the mass of metal is kept under a predetermined pressure until after it freezes, said pressure being so selected that the mass of solidified metal will be substantially unpressurized when it is cooled to ambient temperature.

15. The method defined in claim 12 wherein the mass of metal is kept under a predetermined pressure until after it freezes and said space is sealed off, said pressure being so selected that the mass of solidified metal will be subjected to a substantial pressure when it is cooled to ambient temperature.

References Cited

UNITED STATES PATENTS

| | | | |
|---|---|---|---|
| 1,159,865 | 11/1915 | Pier | 23—289 |
| 1,911,608 | 5/1933 | Davis et al. | |
| 2,337,247 | 12/1943 | Kepler | 220—3 X |
| 2,933,214 | 4/1960 | Douyard | 220—83 X |
| 3,282,459 | 11/1966 | Wilson | 220—3 |
| 3,062,507 | 11/1962 | Andrus | 220—63 X |
| 3,231,338 | 1/1966 | Andrus | 220—3 X |
| 3,260,020 | 7/1966 | Patin | 220—13 X |

FOREIGN PATENTS 490,558  1/1930  Germany.

JOSEPH R. LECLAIR, Primary Examiner

U.S. Cl. X.R.

165—104; 220—83

UNITED STATES PATENT OFFICE
CERTIFICATE OF CORRECTION

Patent No. 3,489,309                                January 13, 1970

Irwin Berman et al.

It is certified that error appears in the above identified patent and that said Letters Patent are hereby corrected as shown below:

Column 2, line 8, "perssure" should read -- pressure --. Column 8, line 1, cancel "that". Column 9, line 15, "radical" should read -- radial --. Column 10, line 1, after "pressure" insert -- due --. Column 11, line 40, "$p_b$" should read -- $p_a$ --. Column 13, line 53, the equation should appear as shown below:

$$E_s \varepsilon_{z2} = \sigma_{z2} - \frac{2\nu_s r_{2i}^2 p_{2i}}{r_{20}^2 - r_{2i}^2}$$

Column 15, line 4, the last part of equation on right side of equation mark should appear as shown below:

$$\frac{E_c}{E_s} \left[ \frac{p_i r_{1i}^2 - 2\nu_s (r_{2i}^2 p_{2i} + r_{1i}^2 p_i - r_{10}^2 p_{10})}{r_{20}^2 - r_{2i}^2 + r_{10}^2 - r_{1i}^2} \right]$$

same column 15, line 41, last part of equation on right side of equation mark should read -- $-\nu_c(-p_{10} + \sigma_{zc})]$ --; line 50, last part of equation on right side of equation mark should read -- $-\nu_c(-p_{2i} + \sigma_{zc})]$ --. Column 19, line 47, "$p_{21}$" should read -- $p_{2i}$ --; line 60, "$\sigma_{+c}$", first occurrence, should read -- $\sigma_{zc}$ --. Column 20, line 51, last part of equation should appear as shown below:

$$(\frac{r_{20}^2 - r_{2i}^2}{r_{10}^2 - r_{1i}^2})]$$

Column 21, line 44, "bulb" should read -- bulk --.

Signed and sealed this 17th day of November 1970.

(SEAL)
Attest:

EDWARD M. FLETCHER, JR.                        WILLIAM E. SCHUYLER, JR.
Attesting Officer                                     Commissioner of Patents